United States Patent
Blair

(10) Patent No.: US 8,467,518 B2
(45) Date of Patent: *Jun. 18, 2013

(54) SYSTEMS AND METHODS FOR ANALYZING CONTACT CENTER INTERACTIONS

(75) Inventor: Christopher D. Blair, South Chailey (GB)

(73) Assignee: Verint Americas, Inc., Alpharetta, GA (US)

(*) Notice: Subject to any disclaimer, the term of this patent is extended or adjusted under 35 U.S.C. 154(b) by 172 days.

This patent is subject to a terminal disclaimer.

(21) Appl. No.: 13/005,906

(22) Filed: Jan. 13, 2011

(65) Prior Publication Data

US 2011/0103572 A1    May 5, 2011

Related U.S. Application Data

(63) Continuation of application No. 11/540,306, filed on Sep. 29, 2006, now Pat. No. 7,873,156.

(51) Int. Cl.
*H04M 3/00* (2006.01)

(52) U.S. Cl.
USPC .................. 379/265.06; 379/265.01

(58) Field of Classification Search
USPC .............. 379/265.01, 265.06, 265.07, 265.09
See application file for complete search history.

(56) References Cited

U.S. PATENT DOCUMENTS

| | | | | |
|---|---|---|---|---|
| 7,584,101 | B2* | 9/2009 | Mark et al. | 704/251 |
| 2006/0178918 | A1* | 8/2006 | Mikurak | 705/7 |
| 2006/0285665 | A1* | 12/2006 | Wasserblat et al. | 379/114.14 |
| 2008/0065902 | A1* | 3/2008 | Spohrer et al. | 713/193 |

* cited by examiner

*Primary Examiner* — Creighton Smith
(74) *Attorney, Agent, or Firm* — Meunier Carlin & Curfman

(57) ABSTRACT

Systems and methods for analyzing contact center interactions are provided. In this regard, a representative method includes: receiving information corresponding to an interaction between a contact center agent and a customer; and assessing quality of the interaction based, at least in part, on information corresponding to at least one of: a history of the customer; and an event corresponding to the customer and occurring subsequent to the interaction.

23 Claims, 5 Drawing Sheets

SYSTEMS AND METHODS FOR ANALYZING CONTACT CENTER INTERACTIONS

RELATED APPLICATIONS

This patent application claims priority to and is a continuation of patent application Ser. No. 11/540,306, filed on Sep. 29, 2006, entitled SYSTEMS AND METHODS FOR ANALYZING CONTACT CENTER INTERACTIONS, and which is hereby incorporated by reference in its entirety.

BACKGROUND

It is desirable in many situations to record communications, such as telephone calls. This is particularly so in a contact center in which many agents may be handling hundreds of telephone calls every day. Recording of these telephone calls can allow for quality assessment of agents, improvement of agent skills and/or dispute resolution, for example.

In this regard, assessment of call quality is time consuming and very subjective. For instance, a telephone call may last from a few seconds to a few hours and may be only one part of a customer interaction or may include several independent interactions. The demeanor of the caller is also influenced by events preceding the actual conversation—for example, the original reason for the call, the time spent waiting for the call to be answered, or the number of times the customer has had to call before getting through to the right person.

Assessing the "quality" of a telephone call is, therefore, difficult and subject to error, even when done by an experienced supervisor or quality assessor. Typically, the assessment of a call is structured according to a pre-defined set of criteria and sub-criteria. Some of these may relate to the initial greeting, the reason for the call, the handling of the core reason for the call, confirming that the caller is satisfied with the handling of the call, and leaving the call.

Automation of the assessment process by provision of standardized forms and evaluation profiles have made such assessment more efficient, but it is still impractical to assess more than a small percentage of calls. Moreover, even with a structured evaluation form, different assessors tend to evaluate a call differently with quite a wide variation of scores. Notably, this degree of inconsistency tends to produce haphazard scoring of agent performance, particularly when agents typically are scored based on a designated number of calls per month.

SUMMARY

In this regard, systems and methods for analyzing contact center interactions are provided. An exemplary embodiment of such a method comprises: receiving information corresponding to an interaction between a contact center agent and a customer; and assessing quality of the interaction based, at least in part, on information corresponding to at least one of: a history of the customer; and an event corresponding to the customer and occurring subsequent to the interaction.

Another exemplary embodiment of such a method comprises: determining review-candidate criteria used for designating which interaction among multiple interactions is to be reviewed; determining review-execution criteria used for determining when an interaction, which is designated for review, can be reviewed; and responsive to identifying an interaction of interest satisfying both the review-candidate criteria and the review-execution criteria, providing access to information corresponding to the interaction of interest and information corresponding to a related interaction such that the interaction of interest can be reviewed in context.

An exemplary embodiment of such a system comprises a communication analyzer operative to an interaction analyzer operative to: receive information corresponding to review-candidate criteria used for designating which interaction among multiple interactions is to be reviewed; receive information corresponding to review-execution criteria used for determining when an interaction, which is designated for review, can be reviewed; identify an interaction of interest satisfying both the review-candidate criteria and the review-execution criteria; and provide access to information corresponding to the interaction of interest and information corresponding to a related interaction such that the interaction of interest can be reviewed in context.

Other systems, methods, features and/or advantages of this disclosure will be or become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiments disclosed herein.

DETAILED DESCRIPTION

At least some of the aforementioned problems with scoring of calls are attributable to calls being reviewed in isolation. That is, when reviewing a call, the reviewer typically has no awareness of the customer experience preceding the call. For instance, such a reviewer is unaware of how long the customer was waiting on hold, how many times the customer attempted to speak to an agent before being answered and/or how many times the customer has called previously regarding the same issue/order/interaction. Additionally, the reviewer oftentimes does not know the outcome of the call; for instance, whether the call resulted in a sale, whether the customer's problem was resolved and/or whether the customer needs to call back again at a later time. Hence, when scoring a call in isolation, the reviewer can only assess the call from the perspective of how well the agent handled the call as a standalone scenario with little to no prior context and certainly no prescience.

In this regard, systems and methods for analyzing contact center interactions are provided. Specifically, several exemplary embodiments will be described in which, in reviewing a call, at least one of the previous history of the customer and subsequent actions corresponding to the customer, e.g., outcome of the call, is considered. Thus, there is an opportunity for the assessment of the call to take into account other aspects of the customer experience, potentially resulting in more effective review.

By reviewing more than a single interaction, e.g., an entire transaction, the reviewer can assess not only the agent's handling of the particular interaction but the overall business' handling of the transaction itself. By way of example, an agent may have done a great job at calming a customer down during a telephone call, but the irritation expressed by the customer may have been due to the company shipping a faulty item. In this example, the agent may not require additional training, but those responsible for designing the item or ensuring quality control may need to evaluate their respective processes. Thus, root cause of business issues can be identified in addition to agent training needs/deficiencies.

Figure 1:
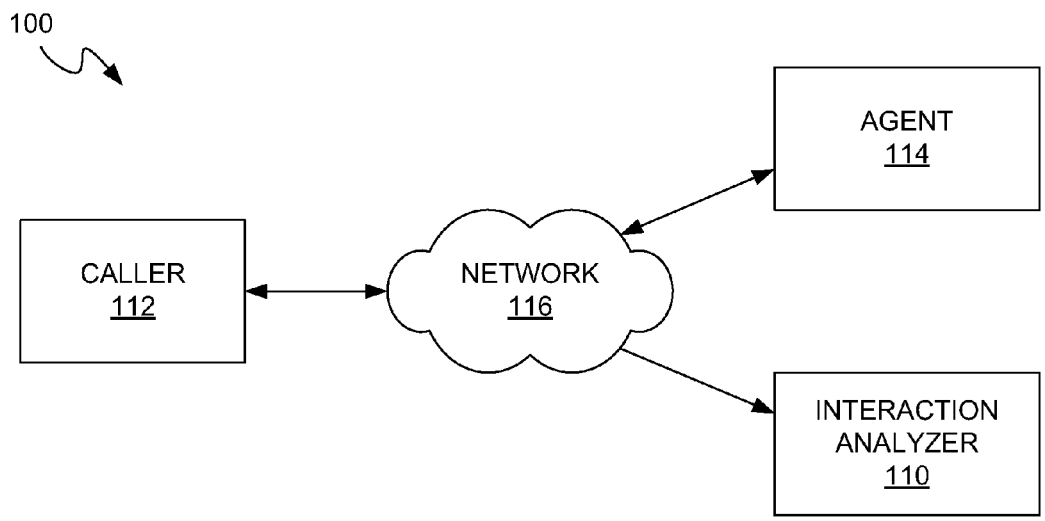
FIG. 1 is a schematic diagram illustrating an embodiment of a system for analyzing contact center interactions.

Referring now in more detail to the drawings, FIG. 1 is a schematic diagram illustrating an embodiment of a system for analyzing contact center interactions. As shown in FIG. 1, system 100 incorporates an interaction analyzer 110 that is configured to enable assessment of an interaction. In FIG. 1, the interaction is associated with a communication session that is occurring between a caller 112 and an agent 114 via a communication network 116. In this embodiment, the agent is associated with a contact center that comprises numerous agents for interacting with customers, e.g., caller 112.

One should note that network 116 can include one or more different networks and/or types of networks. As a non-limiting, example, communications network 116 can include a Wide Area Network (WAN), the Internet, and/or a Local Area Network (LAN).

Additionally, the communication analyzer can receive information corresponding to the communication session directly or from one or more of various components that are not illustrated in FIG. 1. By way of example, the information can be provided from a long term storage device that stores recordings of the communication session, with the recordings being provided to the storage device by a recorder. Additionally or alternatively, the recordings could be provided directly from such a recorder.

Figure 2:
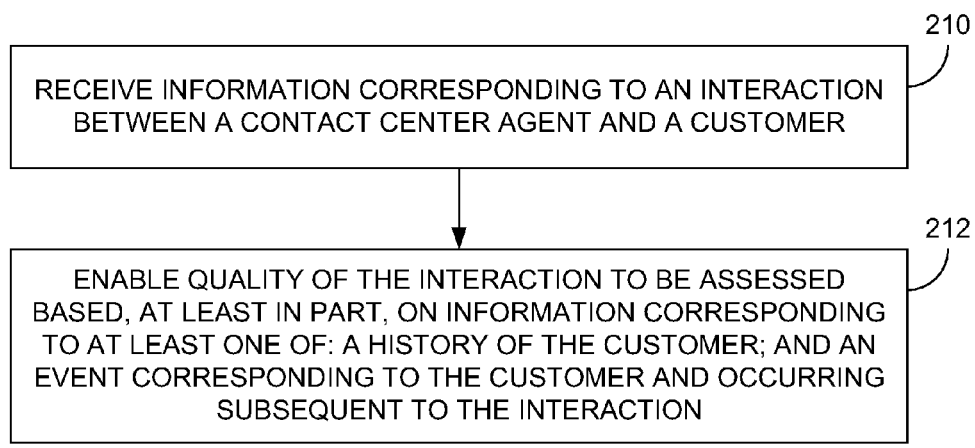
FIG. 2 is a flowchart illustrating functionality that can be preformed by the embodiment of the system for analyzing contact center interactions of FIG. 1.

In operation, the analyzer of FIG. 1 performs various functions (or method steps) as depicted in the flowchart of FIG. 2. As shown in FIG. 2, the functions include: receiving information corresponding to an interaction between a contact center agent and a customer (depicted in block 210); and enabling quality of the interaction to be assessed based, at least in part, on information corresponding to at least one of: a history of the customer; and an action corresponding to the customer and occurring subsequent to the interaction (depicted in block 212). It should be noted that although the embodiment of FIG. 1 can give the impression that all communications are telephone calls, various other forms of communication, such as email and web-based chat, for example, can be used.

Figure 3A:
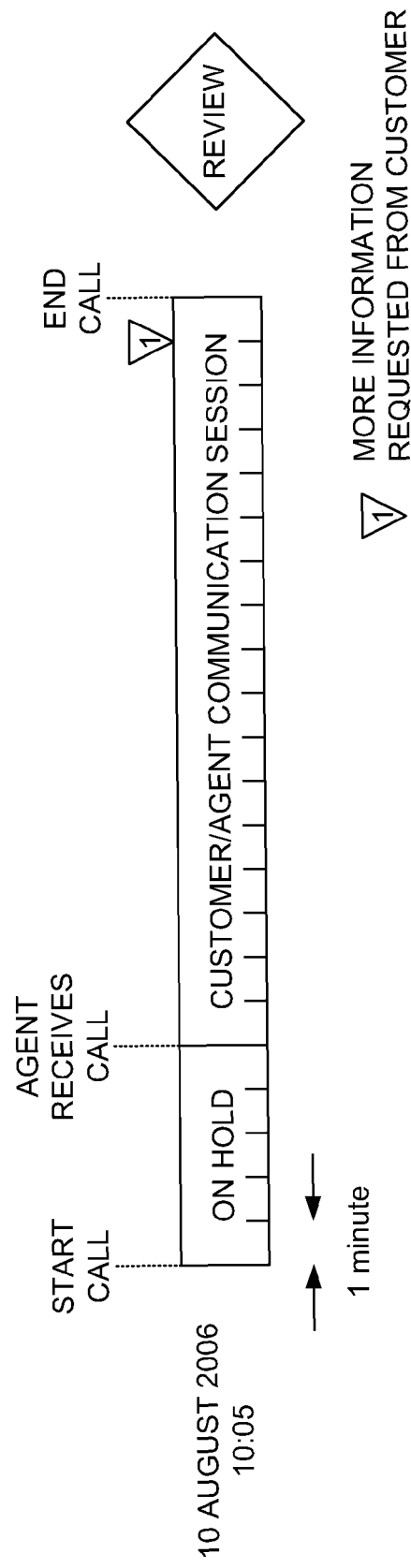
FIG. 3 is a schematic representation of an exemplary interaction.

FIG. 3A is a schematic representation of an exemplary interaction involving a customer and an agent. Specifically, the horizontal bar in FIG. 3A is a simplified timeline indicating events involved in a customer interaction, with the timeline also graphically representing the audio recording associated with that interaction. In this case, the customer contacted an agent for the purpose of renewing an automobile insurance policy. Generally, the events depicted on the timeline include: a "start call" event, which begins an on hold period; an "agent receives call" event, which ends the on hold period and which begins a communication session; a "customer/agent communication session"; and an "end call" event, which terminates the interaction.

Other information available includes: the start date and time of the interaction, in this case, 10 Aug. 2006 at 10:05; timing marks (indicating that the on hold period was 5 minutes and that the communication session lasted for 17 minutes); and a note 1. Note 1 indicates that more information was requested from the customer prior to call termination.

All of the aforementioned information is available to a reviewer for review of the interaction, including the audio recording. Notably, such a review takes place after the call is terminated, as indicated by the "REVIEW" symbol. However, no other information associated with the customer and/or of related interactions is provided. Thus, this interaction is likely reviewed in isolation.

When so reviewed, it is likely that this interaction will be scored as average, i.e., not good and not bad. This is because there is very limited information available upon which to base the score. Thus, the random nature of selecting and reviewing interactions can be relatively ineffective.

Figure 3B:
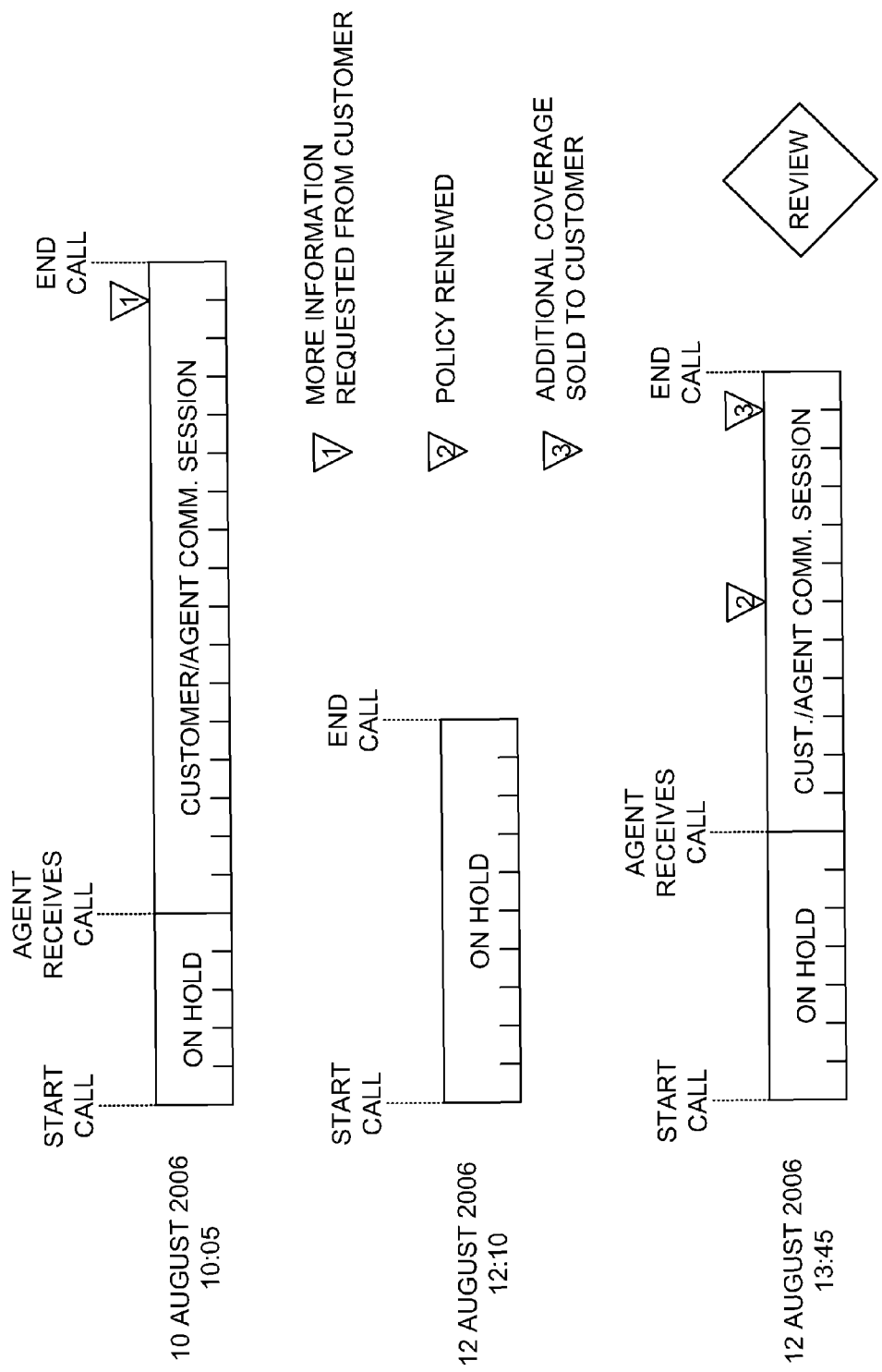

In contrast, FIG. 3B is a schematic representation of exemplary interactions involving a customer and an agent. Specifically, such interactions and associated information (e.g., graphical and/or audible information) can be provided to a user of an embodiment of a system for analyzing contact center transactions. In this regard, such an embodiment enables information associated with an interaction (similar to the one depicted in FIG. 3A) to be reviewed along with other relevant information, thereby potentially resulting in more effective review.

In particular, FIG. 3B depicts three related interactions, in that each involves the same customer. Specifically, information corresponding to a first of the interactions includes: a "start call" event, which begins an on hold period; an "agent receives call" event, which ends the on hold period and which begins a communication session; a "customer/agent communication session"; and an "end call" event, which terminates the interaction. Other information includes: the audio recording of this interaction; the start date and time of this interaction, in this case, 10 Aug. 2006 at 10:05; timing marks (indicating that the on hold period was 5 minutes and that the communication session lasted for 17 minutes); and a note 1. Note 1 indicates that more information was requested from the customer prior to call termination.

With respect to the second interaction, information corresponding to this interaction includes: a "start call" event, which begins an on hold period; and an "end call" event, which ends the on hold period. Other information includes: the audio recording of this interaction; the start date and time of this interaction, in this case, 12 Aug. 2006 at 12:010; and timing marks (indicating that the on hold period was 10 minutes).

With respect to the third interaction, information corresponding to this interaction includes: a "start call" event, which begins an on hold period; an "agent receives call" event, which ends the on hold period and which begins a communication session; a "customer/agent communication session"; and an "end call" event, which terminates the interaction. Other information includes: the audio recording of this interaction; the start date and time of this interaction, in this case, 12 Aug. 2006 at 13:45; timing marks (indicating that the on hold period was 7 minutes and that the communication session lasted for 12 minutes); and notes 2 and 3. Note 2 indicates that the policy was renewed 6 minutes into the communication session, and note 3 indicates that additional coverage was sold to the customer 11 minutes into the communication session.

All of the aforementioned information is available to a reviewer for review of the first interaction, for example. Notably, such a review takes place not only after the call associated with the first interaction has terminated, but after the complete transaction has occurred; in this case, after the automobile insurance policy has been renewed as indicated in the third interaction. Thus, information associated with the customer and of related interactions is provided during review of the first interaction, thereby enabling the reviewer to understand and evaluate the agent based on the context within which the interaction that is to be scored exists.

In scoring of the first interaction, the reviewer may become aware of the customer having terminated a call, i.e., the second interaction, after what the customer may have perceived to be a prolonged on hold time. Additionally, despite the customer's potential frustration, the agent was able to convince the customer to purchase additional insurance coverage instead of merely renewing the previous insurance policy. Clearly, knowledge of these related events could lead a reviewer to score the agent more favorably.

In contrast, one can envision scenarios in which a random customer/agent interaction results in a favorable outcome when viewed in isolation. However, such an interaction may have taken place after multiple attempts by the customer to resolve their issue. Clearly, having access to these other related events, as can be accomplished using an embodiment for analyzing contact center interactions, can provide for more effective review.

Figure 4:
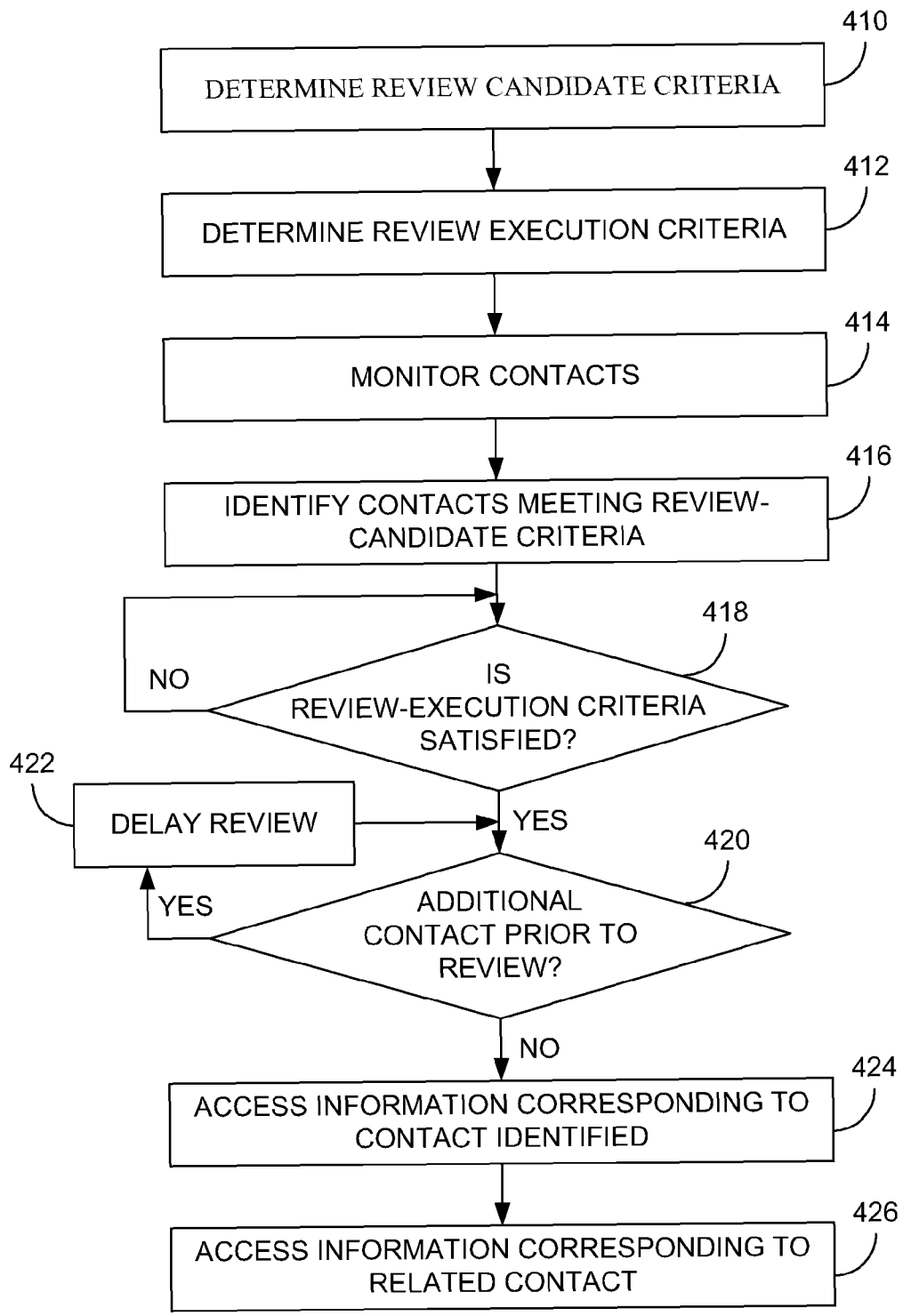
FIG. 4 is a flowchart illustrating functionality that can be preformed by another embodiment of a system for analyzing contact center interactions.

In this regard, FIG. 4 is a flowchart depicting functionality of an embodiment of a system for analyzing contact center interactions. As shown in FIG. 4, the functionality (or method) may be construed as beginning at block 410, in which review-candidate criteria (for deciding those interactions that are to be reviewed) are determined. By way of example, review-candidate criteria can include one or more of information related to customer identification and the number of interactions required to complete a transaction. In block 412, review-execution criteria (for deciding when review of a candidate is to be performed) are determined. For instance, review-execution criteria can include one or more of an event and a waiting period.

In block 414, contacts are monitored and those contacts meeting the review-candidate criteria are identified (block 416). Notably, the contacts can be monitored in real-time or can be monitored subsequent to recording. Then, in block 418, a determination is made as to whether the review-execution criteria have been satisfied with respect to an identified candidate for review. If the review-execution criteria have not been satisfied, the process awaits satisfaction after which the process proceeds to block 420. In block 420, a determination is made regarding whether additional related contact has been made prior to review of the candidate. If such additional contact has been made, e.g., the customer has called the agent again to discuss an issue, the process proceeds to block 422 in which review is delayed until satisfaction of additional review-execution criteria. By way of example, such criteria can include one or more of an event and a waiting period.

Once a determination is made in block 420 that no additional contacts have been made prior to review execution, the process proceeds to block 424 in which information corresponding to the candidate contact, e.g., an audio recording of the contact, is accessed for review. In block 426, information corresponding to one or more other contacts that are related to the candidate contact also is provided.

In some embodiments, audio recordings are associated with a particular customer and/or specific transaction by ANI/CLI. Note that this does not always provide accurate correlation, but can be a reasonably effective indicator especially in consumer businesses in which customers call from home/cellphone. Additionally or alternatively, recordings can be associated with a particular customer and/or specific transaction via integration with an Interactive Voice Response (IVR) and/or Customer Relationship Management (CRM) system resulting in unambiguous customer identification and/or transaction identification. In some embodiments, screen recordings of the agent's desktop during contact with a customer also are correlated with the audio recordings.

In addition to calls where the customer is connected to an agent, in some embodiments, those calls in which the customer rings in (identified by ANI or entry into IVR system) but abandons the call before being answered are also presented as part of the overall "customer experience" to be reviewed. This allows the reviewer to understand and assess the impact of the customer's experience prior to reaching the agent.

In some embodiments, recordings are selected at random for evaluation and/or on the basis of outcome of the call. By way of example, a recording may be selected based on how many subsequent calls are needed. In one example, calls may be deliberately selected according to the number of calls that the customer had to make in order to complete a transaction. That is, as more calls are required for a particular transaction, the higher the probability is that the transaction will be selected for review. Consider, for example, renewal of a car insurance policy. Such a transaction should take a single call but in many cases, a second, third or even fourth call is made in relation to the same subject. Each phone call costs the insurance provider money and causes the customer to expend effort and hence become less satisfied with the service the insurance company is providing. Therefore, as the number of calls for renewing an insurance policy exceeds one call, the transaction becomes a more likely candidate for review.

In some embodiments, calls are not presented for analysis until a pre-determined time has elapsed since the call and/or a pre-determined event has occurred. This delay allows the system to wait until the "outcome" of the call is known. Such delay can vary in duration according to the type of transaction to which the call related. For example, renewal of an annual insurance policy over the phone can often result in a follow-up call when the new policy document arrives. This may, for example, show up an error in the data entered during the call. Therefore, it may be appropriate to wait for a week after the policy document has been issued before considering the call that led to the renewal being presented for review. If one or more calls relating to this policy are received in that period then they can combined with the original call and the set of calls are presented for review.

As an alternative to the time delay technique described above, an event may be treated as an adequate indication that the transaction has been completed successfully and that there is no reason to wait any longer before presenting the call(s) associated with that transaction for review. By way of example, receipt of payment or the closure of a trouble ticket raised on a helpdesk can each be events indicating that the associated transactions are ready for review.

In some embodiments, regardless of whether a time delay technique or an event driven technique is used, any follow-on contact may set a waiting period before review is undertaken. For instance, a call querying the new policy could initiate a waiting period of a week, which is allowed to pass before the transaction is considered complete and presented for review.

Notably, contact from the customer via any medium (e.g., e-mail, web chat and browsing an associated website) may be identified and used to initiate a waiting period. Such contact also could be presented as part of the total experience for review.

In some embodiments, the algorithm used to determine transaction boundaries may differ according to the type of call and/or customer. By way of example, Gold card customers call a specific number (DNIS) and select one of five options from an automated attendant system, e.g. renewal, new policy, policy detail change, etc.

In some embodiments, more calls may be monitored as potential candidates for review (up to potentially all calls) and the number of follow-up calls/contacts may be used as a criterion for selecting which transactions are to be reviewed. For example, 100% of calls leading to a new help desk ticket being created may be tracked. Of those for which the trouble ticket was closed by the end of this call, 1% may be presented for review; 100% of these for which the same trouble ticket was re-opened within a week are presented for review; 10% of transactions resulting in 2 calls in the following week are presented for review; 50% of those resulting in five or more calls in the following week are presented for review; and 100% of those for which the trouble ticket is still open after two weeks are presented for review.

In some embodiments, the number of calls, the number of abandoned calls, the time spent waiting, the number of transfers, the call duration, the time spent on hold, the number of transfers and/or other parameters may be used as part of an overall weighted assessment of the "quality" of the interaction with the customer.

In some embodiments, cases in which a customer conducts multiple transactions during a single contact may be identified and highlighted for review according to different rules than single transaction contacts. For instance, a customer who renews his own and spouse's insurance policy in a single call can be highlighted for review based on a rule that reviews at least one such call per agent per month in order to check that the agent is efficiently remembering relevant customer details and not having to ask for them again. Additionally or alternatively, a case in which a customer conducts multiple transactions during a single contact can be split into individual transactions for review.

In some embodiments, a reviewer may update a previously entered assessment as a result of a customer's later transaction. For instance, a previous transaction had been assessed as "very good" but the customer now says "Last time I ordered this, you sent me the wrong one . . . "

In some embodiments, in addition to the manual assessment of a proportion of transactions, the number of transactions and number of calls required to complete a transaction may be monitored and used as a key performance indicator and/or a component of an overall agent evaluation. For example, considering only the first call for each transaction, note the agent that took this call. If the transaction required no further calls, then give the agent a positive score. If the transaction required one further call, give the agent a negative score; two further calls give them a more negative score (and the agent who took the second segment a negative score too). Thus, a single transaction can affect scoring of all of the agents involved in the transaction, even if they worked on the transaction independently.

A similar approach can be used to derive a "first call resolution rate" for each agent. With enough calls being monitored, a statistically significant "first call resolution rate" can be derived for each agent on each transaction type (or "skill") that they handle. This can then be compared against the average for the call center, their team or peer group. In some embodiments, the aggregated first call resolution rates for each skill/call type can be assessed and compared, with potential problem areas being highlighted.

In some embodiments, customers who consistently requiring multiple or more than the average number of calls to complete a transaction can be identified. This allows the reviewer to assess whether this customer is a "problem customer." Such an identification can result in determining that such a customer is potentially unprofitable, and that it may be worthwhile reviewing whether or not to continue doing business with that customer. Such an identification can also result in determining that the customer is experiencing a persistent or repetitive problem. By way of example, a courier company is unable to deliver to a location within promised time scales and hence a potential resolution can be identified.

In some embodiments, multiple call transactions can be compared to cases where their transactions are completed in single calls. In this way, it may be possible to identify the difference between the successful "one and done" approach and the others.

The interval between successive transactions or, where transactions are overlapping or very frequent, the rate of transactions per month/week/day can be used as a criterion for selecting which transactions should be reviewed. Additionally or alternatively, the value of the transactions may be used. For instance, the more valuable the customer relationship is deemed to be, the more frequently the way that customer is handled should be reviewed. Also, any change to the pattern, e.g. a sudden decrease in order frequency or value, should lead to the current and previous transaction(s) being presented for review. These may give clues to the reason for the change in behavior and suggest ways in which the position can be recovered and/or prevented from happening again/to other customers.

Where transactions involve multiple individuals from an organization and the individuals can be determined (either from entry of their identity as part of the transaction process or by identifying that the speech characteristics of the speaker differ from those previously heard from that customer), selection of which transactions to review can be modified to ensure fairness or deliberate bias. By way of example, the first transaction placed by any individual is reviewed, thereby making sure that they have been entered into the CRM system properly, have been made to feel welcome, have had the ordering process explained to them, etc. As a further example, a higher proportion of transactions made by specific individuals can be reviewed. For instance, contacts by the most senior purchaser are always reviewed.

Figure 5:
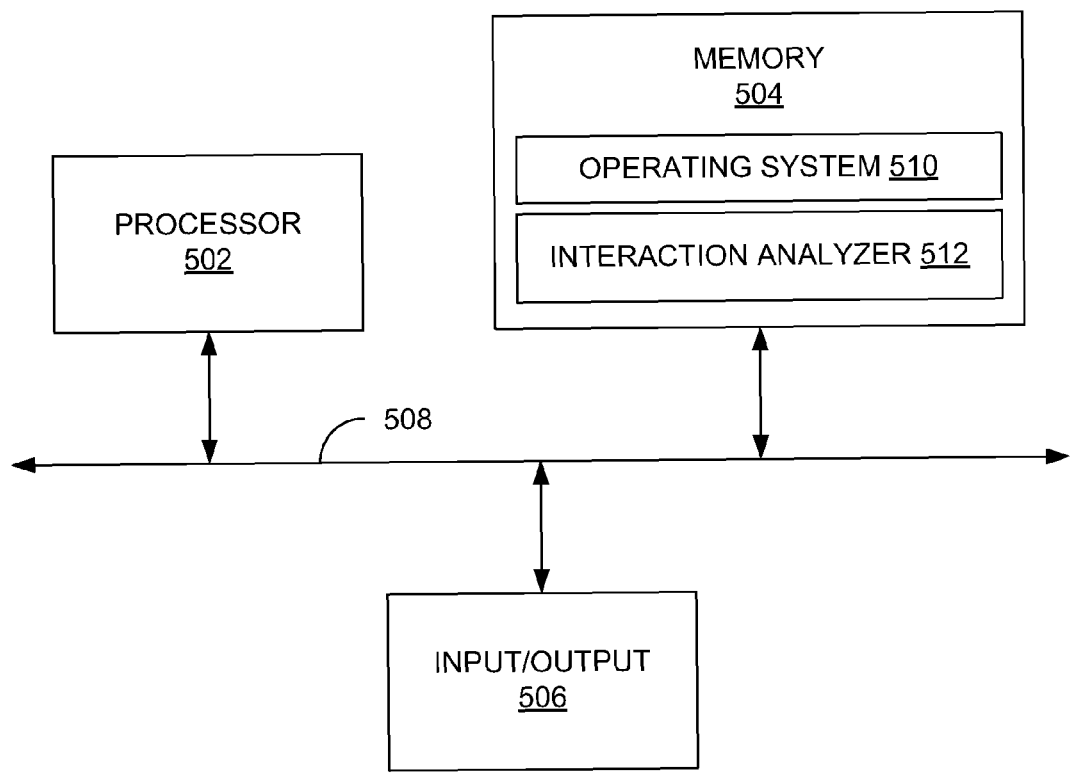
FIG. 5 is a diagram illustrating an embodiment of a system for analyzing contact center interactions that is implemented by a computer.

FIG. 5 is a schematic diagram illustrating an embodiment of a communication analyzer that is implemented by a computer. Generally, in terms of hardware architecture, voice analyzer 500 includes a processor 502, memory 504, and one or more input and/or output (I/O) devices interface(s) 506 that are communicatively coupled via a local interface 508. The local interface 506 can include, for example but not limited to, one or more buses or other wired or wireless connections. The local interface may have additional elements, which are omitted for simplicity, such as controllers, buffers (caches), drivers, repeaters, and receivers to enable communications.

Further, the local interface may include address, control, and/or data connections to enable appropriate communications among the aforementioned components. The processor may be a hardware device for executing software, particularly software stored in memory.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory includes an operating system 510, as well as instructions associated with an interaction analyzer 512, the functionality of exemplary embodiments of which are described above, e.g., the functionality described with respect to the flowchart of FIG. 4.

It should be noted that embodiments of one or more of the systems described herein could be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more various functions such as receiving, capturing, intercepting and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence and compliance purposes, for example. Such integrated functionalities improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities. Referring back to the collections example outlined above, by using emotion and concept detection, companies can identify which customers are attempting to mislead collectors into believing that they are going to pay. The earlier the company is aware of a problem account, the more recourse options they will have. Thus, the speech analytics of the present disclosure can function as an early warning system to reduce losses.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device.

More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations. Many variations and modifications may be made to the above-described embodiments. All such modifications and variations are intended to be included herein within the scope of this disclosure.

The invention claimed is:

1. A method for analyzing contact center interactions comprising:
   determining review-candidate criteria used for designating which interaction among multiple interactions is to be reviewed;
   determining review-execution criteria used for determining when an interaction, which is designated for review, can be reviewed;
   responsive to identifying an interaction of interest satisfying both the review-candidate criteria and the review-execution criteria, providing access to information corresponding to the interaction of interest and information corresponding to a related interaction such that the interaction of interest can be reviewed in context; and
   delaying review for a predetermined time period responsive to determining that a customer associated with the interaction of interest has attempted another interaction subsequent to the interaction of interest.

2. The method of claim 1, wherein the review-candidate criteria includes a predetermined number of interactions for completing a transaction such that, responsive to determining that a customer has had at least the predetermined number of interactions for completing a transaction, at least one of those interactions is designated for review.

3. The method of claim 1, wherein the review-candidate criteria includes a customer identification such that, responsive to determining that a particular customer is a party to an interaction, that interaction is designated for review.

4. The method of claim 1, wherein the review-execution criteria includes a specified event such that, responsive to determining that the specified event has occurred, the interaction designated for review can be reviewed.

5. The method of claim 1, wherein the review-execution criteria includes a waiting period such that, responsive to determining that the waiting period has expired, the interaction designated for review can be reviewed.

6. The method of claim 1, further comprising:
   recording the interactions.

7. The method of claim 6, wherein, in recording the interactions, audio and screen information is recorded.

8. The method of claim 1, further comprising performing automated evaluation of the interaction of interest.

9. The method of claim 8, wherein performing automated evaluation comprises performing script adherence analysis.

10. The method of claim 8, wherein performing automated evaluation comprises evaluating the interaction of interest for fraud.

11. The method of claim 1, wherein at least some of the interactions are facilitated using Internet Protocol packets.

12. The method of claim 11, monitoring the Internet Protocol packets to identify interactions satisfying the review-candidate criteria and the review execution criteria.

13. A method for analyzing contact center interactions comprising:
   receiving information corresponding to an interaction between a contact center agent and a customer;
   assessing quality of the interaction based, at least in part, on information corresponding to at least one of: a history of the customer; and an event corresponding to the customer and occurring subsequent to the interaction;
   delaying assessing for a predetermined time period responsive to determining that a customer associated with the interaction has attempted another interaction subsequent to the interaction that is to be assessed for quality.

14. The method of claim 13, wherein the information corresponding to a history of the customer includes information corresponding to a previous interaction of that customer.

15. The method of claim 13, wherein the event is completion of a transaction associated with the interaction.

16. A system for analyzing contact center interactions comprising:
   an interaction analyzer operative to:
   receive information corresponding to review-candidate criteria used for designating which interaction among multiple interactions is to be reviewed;
   receive information corresponding to review-execution criteria used for determining when an interaction, which is designated for review, can be reviewed;
   identify an interaction of interest satisfying both the review candidate criteria and the review-execution criteria;
   provide access to information corresponding to the interaction of interest and information corresponding to a related interaction such that the interaction of interest can be reviewed in context; and
   delay assessing for a predetermined time period responsive to determining that a customer associated with the interaction has attempted another interaction subsequent to the interaction that is to be assessed for quality.

17. The system of claim 16, wherein the information corresponding to a related interaction includes at least one of: a history of the customer; and an event, corresponding to the customer, occurring subsequent to the interaction.

18. The system of claim 16, wherein the review-candidate criteria includes a predetermined number of interactions for completing a transaction such that, responsive to determining that a customer has had at least the predetermined number of interactions for completing a transaction, at least one of those interactions is designated for review.

19. The system of claim 16, wherein the review-execution criteria includes a waiting period such that, responsive to determining that the waiting period has expired, the interaction designated for review can be reviewed.

20. The system of claim 16, wherein the interaction analyzer is further operative to monitor Internet Protocol packets associated with the multiple interactions to identify those interactions satisfying the review-candidate criteria and the review-execution criteria.

21. The system of claim 16, further comprising a computer, and wherein the interaction analyzer is embodied as software executing on the computer.

22. The system of claim 16, further comprising a recorder operative to record the interaction of interest.

23. The system of claim 16, further comprising means for recording the interaction of interest.

* * * * *